United States Patent [19]

Wu

[11] Patent Number: 5,543,096
[45] Date of Patent: Aug. 6, 1996

[54] METHOD FOR PRODUCING ACTIVATED CARBON BODIES HAVING SILICONE RESIN BINDER

[75] Inventor: Shy-Hsien Wu, Horseheads, N.Y.

[73] Assignee: Corning Incorporated, Corning, N.Y.

[21] Appl. No.: 304,533

[22] Filed: Sep. 12, 1994

[51] Int. Cl.[6] .................................................. C04B 35/64
[52] U.S. Cl. ............................... 264/63; 264/43; 264/234
[58] Field of Search .................................. 264/63, 43, 234

[56] References Cited

U.S. PATENT DOCUMENTS

| | | | |
|---|---|---|---|
| 3,922,412 | 11/1975 | Yoshikawa et al. | 428/118 |
| 4,259,299 | 3/1981 | Hagiwara et al. | 423/210 |
| 4,518,704 | 5/1985 | Okabayashi et al. | 502/80 |

FOREIGN PATENT DOCUMENTS

| | | |
|---|---|---|
| 49-115110 | 11/1974 | Japan . |
| 57-122924 | 7/1982 | Japan . |

*Primary Examiner*—Christopher A. Fiorilla
*Attorney, Agent, or Firm*—L. Rita Quatrini

[57] ABSTRACT

An activated carbon body and method for making the body which involves forming a wet mixture of in percent by weight based on activated carbon, about 2% to 10% organic binder which can be cellulose ethers, and/or their derivatives, 0 to about 4% of polyvinyl alcohol, about 5% to 40% bentonite clay, about 10% to 50% silicone resin, vehicle having a boiling point of at least about 100° C., and the balance of the mixture being activated carbon particles. The mixture is formed into a green body which is then dried and heat-treated.

18 Claims, No Drawings

METHOD FOR PRODUCING ACTIVATED CARBON BODIES HAVING SILICONE RESIN BINDER

This invention relates to activated carbon bodies having silicone resin and bentonite clay as binders and to the method of making them. The bodies of the present invention by virtue of these binders have strength at high temperatures after having undergone the appropriate heat-treatment, and are water resistant after the appropriate heat-treatment. Additionally, their surface area is retained after a proper heat-treatment thus allowing them to efficiently adsorb hydrocarbons.

BACKGROUND OF THE INVENTION

Activated carbon materials are commonly used to adsorb hydrocarbons and other impurities from gas streams (frequently air) and liquids.

For these applications, the carbon is generally used in the form of granules. While activated carbon in the form of granules can perform the desired adsorption for many applications, there are some applications in which the granules have drawbacks. In some cases back pressure is a problem with the granules since the flow must follow a tortuous path. Some applications can result in considerable wear of the granules by attrition, causing loss of material or bed packing due to the fines resulting in the blocking of the flow.

Another approach is to use an extruded activated carbon in the form of a cellular structure such as a honeycomb. These structures can readily be shaped by extruding fine powders of activated carbon with suitable binders. The honeycomb shape allows for ease of flow of the gases therethrough with little back pressure. Also, the geometry can be such as to allow easy access of the gases to all of the carbon for adsorption of the species to be removed. In the use of granules, the adsorbing species must diffuse into the center of the granule. This diffusion distance can be great compared to the thickness of the web of a honeycomb. Also, since a honeycomb is a solid piece, there should be little or no wear or attrition of the carbon.

Among the uses for such activated carbon honeycombs are the adsorption of hydrocarbon vapors in automotive applications. There are two automotive applications: (1) the evaporative emissions of vapors from the fuel system and the engine intake areas, and (2) cold start application.

In the case of evaporative emissions, the activated carbon adsorbs vapors given off from the fuel system while the vehicle is not operating, such as from the expansion and contraction of gases in the fuel tank with temperature swings. During refueling, the air which is displaced from the tank carries along considerable fuel as vapors which must be captured to meet future air pollution standards. The adsorbed species is then desorbed while the engine is operating and recycled back into the engine intake to be burned. Most vehicles today have an activated carbon canister filled with the granules to take care of some sources of vapors. However, this is not adequate to meet future requirements.

In the cold start application the activated carbon adsorbs hydrocarbons emitted during the initial 90 to 120 seconds after start-up of the engine. During this start-up period, the catalytic converter is not up to temperature for converting the hydrocarbons being emitted from the engine. Once the catalytic converter is up to temperature, the activated carbon can be removed from the exhaust system in a by-pass mode. The adsorbed hydrocarbons are desorbed from the activated carbon and are fed into the engine or into the exhaust ahead of the catalytic converter where they are converted to innocuous entities. The activated carbon is thus ready to adsorb hydrocarbons during the next cold start cycle.

In order to form an activated carbon honeycomb by extrusion, the carbon must be in the form of a fine powder. This can then be mixed with a liquid such as water and suitable plasticizers and binders. This plasticized mixture is then extruded through a die into the honeycomb shape, and dried.

Organic binders such as methylcellulose provide plasticity to the mixture. Such mixtures are relatively soft and difficult to handle in the wet as extruded state before drying. Moreover, the bodies formed from such mixtures are relatively low in strength especially at elevated temperatures such as 250° C. which are encountered in applications such as auto exhaust purification. This is a result of the degradation of the organic binders.

It is highly desirable to improve the strength of the extruded honeycomb both in the extruded state for further processing and handling and also after drying to improve performance.

Clays and resins have been used as binders in carbon mixtures to impart strength to the carbon body formed therefrom.

However, high levels of some binders result in decreased surface area in the body when used in the as-formed state. As a result, the adsorption efficiency of the activated carbon decreases. This is an important consideration in hydrocarbon adsorption applications.

U.S. Pat. Nos. 4,259,299, 4,518,704, and Japanese patent application publication no. 57-122924 (1982) relate to activated carbon bodies in which clay binders are used.

U.S. Pat. Nos. 4,259,299 relates to using bentonite in activated carbon-zeolite mixtures. The material is heated to 350° C. to develop strength. Although some strength is developed, the material breaks down if in contact with water. This is because of the bentonite which absorbs water and expands causing complete breakdown of the structure. Japanese patent publication No. 49-115,110 (1974) relates to a carbon material honeycomb body made by mixing carbon material or carbonizable material, thermosetting resin, binder and suitable solvent to form a plastic mixture, extruding and firing. The binder can be a thermoplastic or thermosetting resin such as phenol, Formalin, etc., CMC, dextrin, etc. For increasing strength bentonite, kaolin, etc. clay materials can be mixed in.

There remains a need to produce activated carbon bodies of improved strength to allow them to function effectively in high temperature applications such as in auto exhaust purification applications without sacrificing surface area and hence adsorption efficiency. Also there is a need to produce activated carbon bodies which maintain their structural integrity when in contact with water.

SUMMARY OF THE INVENTION

In accordance with one aspect of the invention, there is provided a method for making an activated carbon body which involves forming a wet mixture comprising in percent by weight based on activated carbon, about 2% to 10% organic binder which can be cellulose ethers, and/or their derivatives, 0 to about 4% of polyvinyl alcohol, about 5% to 40% bentonite clay, about 10% to 50% silicone resin, vehicle having a boiling point of at least about 100° C., and the balance of the mixture being activated carbon particles. The mixture is formed into a green body which is then dried and heat-treated.

In accordance with another aspect of the invention, there is provided an activated carbon body made by the above described method.

DETAILED DESCRIPTION OF THE INVENTION

This invention relates to a method of making high temperature stable activated carbon bodies.

The method involves forming a wet mixture of activated carbon particles, plasticizing organic binder which can be cellulose ether, cellulose ether derivatives or combinations of these, co-binders include inorganic co-binder of bentonite clay and organic co-binder of silicone resin, the latter being a rheological enhancer, and a vehicle which has a boiling point of at least about 100° C. Optionally polyvinyl alcohol can be present as a co-binder. The mixture is formed into a body, dried, and heat-treated. When oleic acid or a mixture of oleic acid and water are used, the drying time is shorter than if water alone is used. When water alone is the vehicle it is preferred to have a curing step for the silicone resin. With other vehicle compositions there is no curing step for the silicone resin.

The bentonite clay and silicone resin combination and the proper process temperatures provide a body with good adsorption capacity and high temperature strength. The silicone resin contributes to enhanced formability as reflected in consistently obtained smooth skin quality of honeycomb using various types of carbon powders, for example. The body also has good resistance to water.

The Type of Carbon

Activated carbon is characterized by a very high surface area, generally above about 500 $m^2/g$, and a microstructure having a fissured surface and internal microporosity of pore sizes in the range of about 2 to about 10 angstroms. A primary tool for the characterization of activated carbon is BET surface area measurement using nitrogen adsorption.

Depending on the application, the nature of the activated carbon can vary as far as particle size, surface area, adsorption capacity for hydrocarbons, adsorption efficiency, porosity, pore size, etc. The carbon can be a single type or a blend of types based on for example, precursor source, particle size, porosity, etc.

For hydrocarbon adsorption applications, the preferred type of activated carbon is what is considered to be a collection of very small graphitic platelets which are bound together with an open structure leading to high surface area.

(1) One advantageous type of activated carbon is that having an average particle size of about 3 to 10 micrometers in diameter and surface area as measured by $N_2$ BET method of about 1050 to 1300 $m^2/g$.

(2) Another advantageous type of activated carbon is that having about 80% by weight activated carbon particles of (1), and about 20% by weight of the activated carbon particles of average particle size of about 10 to 50, preferably 20–50 micrometers in diameter and a surface area as measured by $N_2$ BET method of about 1300 to 1350 $m^2/g$.

One source of activated carbon type (1) suitable for use in this invention is BPL F3 activated carbon available from Calgon Corp. in several particle sizes and at different measurements of surface area. A particular preferred variety of activated carbon from this source is the "6×16" mesh size, which is available at a surface area of about 1050 to about 1300 $m^2/g$.

Another especially suited combination of activated carbon powders is 80% Calgon Carbon BPL-F3® and about 20% Nuchar® SN-20 which is a coarse powder available from Westvaco, having an average particle size of about 20–50 and usually about 30 micrometers in diameter and a surface area as measured by $N_2$ BET method of about 1300–1350 $m^2/g$.

The Organic Binder

The organic binder imparts plasticity to the mixture. Organic binder according to the present invention refers to thermally gellable binders: cellulose ether type binders and/or their derivatives, typically methylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Advantageously methylcellulose and/or its derivatives are used in the practice of the present invention. Methylcellulose, hydroxypropyl methylcellulose, and combinations thereof are especially preferred. Preferred sources of cellulose ethers and/or derivatives thereof, are Methocel® A4M and K75M from Dow Chemical Co. Methocel® A4M is a methylcellulose binder having a gel temperature of 50°–55° C., and a gel strength of 5000 $g/cm^2$ (based on a 2% solution at 65° C.). Methocel® K75M is hydroxypropyl methylcellulose.

The Co-binders

According to this invention co-binder can be an organic binder that can be used to enhance the plasticity characteristics of the mixture and function as a precursor for $SiO_2$ binder. Silicone resins and optionally polyvinyl alcohol (PVA) have been found suitable to use as a co-binders. Co-binder can be an inorganic binder such as bentonite clay that is used to enhance strength to the formed body.

The Bentonite Clay

Bentonite refers to a class of clays containing montmorillonite as the essential mineral. This type of clay contains aluminum silicate with about 3–4 wt. % MgO. This is a very fine clay which can contribute plasticity to a mixture and contribute bonding power to both the as-formed and the dried bodies. Different grades of bentonite are available from different suppliers and can vary somewhat in particle size and impurities depending on the deposit from which they come and on the degree of processing. The clay is of fine particle size for even distribution throughout the mixture. Generally the average particle size of the bentonite is less than one micrometer in diameter. Suitable bentonite clays, especially as far as fine particle size, are those which are similar to that which was in the past supplied by Georgia Kaolin under the name of Bentolite L®. Another suitable bentonite clay is supplied by Dry Branch Kaolin under the name of Bentonite K-129.

The Silicone Resin

The silicone resin can be any one or combination of silicone resins available commercially today. The preferred resins are crosslinkable silicones containing reactive silanol groups. The silicone resin is added to the mixture in the form of an aqueous emulsion of silicone in water. Ready prepared emulsions are available commercially. For example, some especially suitable commercial silicone resin emulsions are resin 1-0468 and 1-0469, which are supplied by Dow Corning. Resin 6-2230 from Dow Corning is in powder form and can be added to the mixture with an appropriate solvent such as isopropyl alcohol or pre-dissolved in dibasic ester solvent. All yield about 50% $SiO_2$ on heat-treating.

The Vehicle

The vehicle can be water, oleic acid, oleic acid derivatives, linoleic acid, linoleic acid derivatives, or combinations of these. The vehicle is most typically either water or a combination of water and oleic acid.

Unless otherwise indicated, the weight percents of the components, (i.e., organic and co-binders such as bentonite, silicone resin, and PVA), and vehicle in the mixture are based on the carbon content. For example, the percent of any component or vehicle in the mixture is calculated as follows:

$$\frac{\text{wt. of component (or wt. of vehicle)}}{\text{wt. units of carbon}} \times 100$$

A wet mixture is formed comprising in percent by weight about 2% to 10% of the organic binder, 0 to about 4% of PVA, about 5% to about 40% bentonite clay, and about 10% to about 50% silicone resin, vehicle having a boiling point of at least about 100° C. and the balance of the mixture being activated carbon particles.

Other components can be present in the mixture such as forming, aids, for example extrusion aids, lubricants, and surfactants.

More advantageously the organic binder content is about 4% to about 8%, and most advantageously about 6% to about 8% by weight for optimum plasticity and from an economic standpoint.

More advantageously the PVA content is about 0% to about 3% by weight. It is advantageous to have some PVA in the mixture to enhance the plasticity characteristics of the mixture. Most advantageously the PVA content in the mixture is about 1% to 3% for optimum plasticity and from an economic standpoint.

More advantageously the bentonite content is about 5% to 30%, and most advantageously about 10% to 30% for optimum strength. Values lower than these ranges result in decrease strength.

More advantageously, the silicone resin content is about 10% to 40%, and most advantageously about 20% to 40% by weight. Values lower than these ranges result in decreased strength. Values higher than these ranges, result in decreased adsorption capacity of the carbon body.

One advantageous mixture composition which results in high strengths at elevated temperatures while preserving the surface area of the body thereby maintaining the adsorption ability for hydrocarbons comprises in percent by weight based on carbon about 4% to 8% organic binder such as methylcellulose, hydroxybutyl methylcellulose, hydroxypropyl methylcellulose, hydroxyethyl methylcellulose, sodium carboxy methylcellulose, and combinations of these, with the preferred being methylcellulose and/or hydroxypropyl methylcellulose, 0 to about 3% PVA, about 5% to 30% bentonite clay, about 10% to 40% silicone resin, and the balance being activated carbon particles. Here the most typical vehicle is water with a mixture of water and organic acid e.g., oleic acid, being a good alternative, in an amount sufficient to render the mixture plastically formable.

A more advantageous composition comprises in percent by weight based on carbon about 6% to 8% organic binder which can be methylcellulose, hydroxybutyl methylcellulose, hydroxypropyl methylcellulose, hydroxyethyl methylcellulose, sodium carboxy methylcellulose, and combinations of these, with the preferred being methylcellulose and/or hydroxypropyl methylcellulose, about 1% to 3% polyvinyl alcohol, about 10 to 20% bentonite clay, about 20% to 40% silicone resin, and the balance of the mixture being activated carbon particles with water or a mixture of water and an organic acid e.g. oleic acid being the most typical vehicle.

One especially advantageous composition which results in high strengths at elevated temperatures comprises in percent by weight based on carbon about 6% organic binder preferred of which is methylcellulose or hydroxypropyl methylcellulose, about 2% of polyvinyl alcohol, about 20% bentonite clay, about 30% to 40% silicone resin, and the balance of the mixture being activated carbon particles. The vehicle is most typically water or a mixture of water and an organic acid, e.g., oleic acid being the most typical vehicle.

The mixture is formed by dry blending the solid components and then mixing with the liquids e.g., silicone resin emulsion and water. One technique of mixing, although it is to be understood that the invention is not limited to such is to place the dry blended components in a mix muller or other type of mixer such as a sigma blade or double arm mixer. While the solids are being mixed, the liquids are added. Once the liquid has been added, the muller or other mixer is run until the batch compacts and becomes plasticized.

The vehicle content in the mixture can be adjusted in order to impart optimum plasticity and handleability to the mixture. As the mixture is being mixed and vehicle is being added, a point is reached at which the vehicle is sufficient to wet all the particles. Continued mixing compacts the powder by removing air, and the compacted powder starts to agglomerate into lumps. Continued mixing results in these lumps becoming plastic. Excess water makes these lumps too soft for the forming process. Typically, water contents of about 140% to about 180% and most typically about 160% by weight based on the carbon content impart good plasticity and handleability to the mixture.

Once the mixture is observed to be well plasticized, as indicated by hand or torque rheometer, it is formed into a body.

The bodies according to the present invention can have any convenient size and shape. For example, for hydrocarbon adsorption in engine exhaust purification, the preferred shape is a cellular body such as a honeycomb structure.

Some examples of honeycombs produced by the process of the present invention, although it is to be understood that the invention is not limited to these, are those having about 94 cells/cm$^2$ (about 600 cells/in$^2$), about 62 cells/cm$^2$ (about 400 cells/in$^2$), or about 47 cells/cm$^2$ (about 300 cells/in$^2$), about 31 cells/cm$^2$ (about 200 cells/in$^2$), about 15 cells/cm$^2$ (about 100 cells/in$^2$) or about 1.4 cells/cm$^2$ (9 cells/in$^2$). Typical wall (web) thicknesses in catalytic converter applications, for example, are about 6 mils (about 0.15 mm) for 400 cells/in$^2$ (62 cells/cm$^2$) honeycombs. Web thicknesses range typically from about 4 to about 35 mils (about 0.1 to about 0.9 mm). The external size and shape of the body is controlled by the application.

The forming can be done by any method that makes use of shaping a plasticized mixture. The preferred method of forming is by extrusion. A ram extruder is typically used, although any extrusion equipment known in the art can be used such as a continuous auger or twin screw extruder.

In forming honeycomb structures, it is preferred to extrude the mixture through a honeycomb die.

If desired, the formed body can be cut into parts of varying sizes.

The resulting formed body is then dried.

Different drying techniques are used depending on the vehicle.

For example, when water alone is used, because the bodies have a relatively high water content due mostly to the porosity of the carbon particles, care is taken to ensure that the bodies dry slowly and evenly so that they do not crack.

One drying technique involves wrapping the bodies in aluminum foil and placing them in a dryer set at no higher than about 100° C. typically at about 95° C. for a sufficient time to remove the water. The foil creates a humid environment so that the extruded bodies dry slowly and uniformly thus preventing cracking. Drying time can vary depending on the size of the body. For a 2.54 cm (1") diameter, 22.9 cm (9") long honeycomb, the drying time is typically about 4 days.

Another drying technique involves drying by a procedure involving control of relative humidity, or by first subjecting the body to electromagnetic radiation (microwave), followed by the relative humidity control drying procedure.

According to this invention, a large amount of organic acid vehicle e.g., oleic acid, linoleic acid, linolenic acid, ricinoleic acid, their derivatives, or combinations of these can be used to replace batch water in approximately a 1:1 weight ratio without affecting appreciably batch extrusion rheology. As water was reduced by the substitution of an equivalent amount of oleic acid in a batch, honeycomb samples were dried faster, thus reducing very substantially the drying time of an extruded carbon honeycomb.

Typically the relative humidity control procedure is carried out according to the following schedule.

| Step | T °(C.) | RH (%) | t (hrs.) |
|---|---|---|---|
| 1 | 35–90 | 90–95 | 1–7 |
| 2 | 88–95 | 90–95 | 1–7 |

After steps 1 and 2, it is preferred to carry out the following additional steps:

| | | | |
|---|---|---|---|
| 3 | 90–95 | 90–80 | 2–6 |
| 4 | 90–95 | 80–70 | 2–6 |
| 5 | 90–60 | 70–60 | 2–6 |
| 6 | 60–30 | 60 | 2–6 |

Results of studies on various effects are summarized in the following. The addition of oleic acid was done by adding a specific amount of oleic acid to the solid components in a Littleford mixer and mixing for about 3 minutes. The treated powders were then forwarded to a muller for addition of liquid components, e.g., silicone resin emulsion and vehicle to plasticize the mixture for extrusion. Honeycombs having a diameter of 2.54 cm (1") were dried by being wrapped in foil and heated at about 95° C. or by following the schedules in a humidity controlled oven.

The three schedules used in the current studies were:

| Step | T °(C.) | RH (%) | t (hrs. |
|---|---|---|---|
| Schedule A | | | |
| 1 | 35–90 | 95 | 5 |
| 2 | 90 | 95 | 5 |
| 3 | 90 | 95–80 | 10 |
| 4 | 90 | 80–70 | 10 |
| 5 | 90–60 | 70–60 | 10 |
| 6 | 60–30 | 60 | 10 |
| | | | Total 50 |
| Schedule B | | | |
| 1 | 35–90 | 90 | 5 |
| 2 | 90 | 90 | 5 |
| 3 | 90 | 90–80 | 10 |
| (Steps 4, 5, and 6 similar to Schedule A) | | | |
| | | | Total 50 |

-continued

| Step | T °(C.) | RH (%) | t (hrs. |
|---|---|---|---|
| Schedule C | | | |
| (The first 2 steps similar to Schedule B) | | | |
| 3 | 90 | 90–60 | 5 |
| 4 | 90 | 80–70 | 5 |
| 5 | 90–60 | 70–60 | 5 |
| 6 | 60–30 | 60 | 5 |
| | | | Total 30 |

At this point, depending on the vehicle, the resin can be cured or left uncured. If the vehicle is water, the resin is normally cured. If the vehicle has an organic vehicle component e.g., one or more of oleic acid, linoleic acid, or their derivatives, it is preferred that the resin not be cured especially if good adsorption is desired.

Curing involves heating the dried body at an elevated temperature to cross-link the silicone resin. It to be understood that curing time and temperature depend on the nature and amount of resin. However, typically the curing temperatures are about 200° C. to 250° C., and usually about 230° C. in a conventional oven in air for about 15 to 60 minutes.

The next step is to heat-treat the body whether cured or uncured to restore surface area to the body which might have been lost by the presence of the binder, clay, and resin. The temperatures for this heat-treatment step are usually about 1000° C. to about 1300° C. for about 1 to 8 hours in a non-reacting atmosphere e.g., nitrogen. The heat-treatment temperature is more advantageously about 1100° C. to 1300° C. for about 1 to 2 hours.

The bodies made by the method of the present invention are characterized by having the bentonite and silica from the cured or uncured silicone resin as binders to bond the carbon particles together especially at relatively high temperatures such as about 200° C. and above. The bentonite content is essentially the same as in the starting mixture. The organic binder and co-binder content are most likely reduced because of the heat-treatments, the degree of reduction being dependent on heat-treating conditions of temperature, time, etc. The content of the silicone resin after the heat-treating steps can vary from the content before the heat-treating steps.

To more fully illustrate the invention, the following non-limiting examples are presented. All parts, portions, and percentages are on a weight basis unless otherwise stated.

General Procedure:

A typical activated carbon mixture or batch was made up of activated carbon powders which were either 100% BPL-F3 (Calgon) or 80% BPL/20% Nuchar SN-20 (Westvaco), polyvinyl alcohol which was Airvol 205S (2%), Methocel A4M (6%) methyl cellulose, bentonite (0–40% with GK 129 or Bentolite L), 1-0469 resin (0–40%) and water with or without oleic acid. The first 4 types of powders were blended in a Turbula (30 minutes) or in a Littleford (3 minutes) if oleic acid was present. The mixed powders were placed in a muller to add a diluted 0469 emulsion followed by a proper amount of water (up to ~160% in total) to plasticize the whole batch. Cellular substrates of mostly 31 cells/cm$^2$ (200 cpsi)/0.4–0.6 mm (15–22 mil) wall/2.54 cm (1") diameter and 23 cm (9") long (plus a few of 62 cells/cm$^2$ (400 cpsi)/0.2 mm (7 mil) wall) were obtained from the batch, wrapped in aluminum foil and dried in an oven (95° C./4 days). The dried samples were cured at 230° C. for 30 minutes or not cured, and heat-treated under nitrogen for 4 hours at 1100° C. (some at 1200° C. and 1300° C.). Then these samples were ready for tests of high temperature strength, water stability and butane gas adsorption.

For a strength test, 2.54 cm (1") diameter samples were subjected to a thermal aging of 4 hours at 225°, 250°, 300° and 350° C. in the air (4 samples in each condition) and their averaged crushing strengths after each aging step were compared against those before aging at RT.

For a water stability test, 2.54 cm (1") diameter sample was soaked in 40 cc distilled water for up to one month, and periodically tested for its strength/integrity by squeezing it between fingers and rubbing its surface.

Butane adsorption capacity was measured by placing test samples in a Vycor® tube housed inside a tube furnace having inlet and outlet ports. A 1500 volume ppm butane gas stream in a nitrogen carrier gas was introduced to the sample at a flow rate of about 4,000 cc/min. and adsorption was measured by monitoring the exit gas stream with a flame ionization detector. Adsorption at room temperature was considered complete when the calibrated detector reading had reached about 95%. The detector readings were plotted versus time and the adsorption was measured by integrating the area of each curve. The values reported for adsorption are the milligrams of butane adsorbed divided by the sample mass after testing.

SYSTEM WITH WATER AS VEHICLE

For this system, a batch water content of ~160% (based on carbon) was used and a long drying time of 4 days at 95° C. was needed to dry samples (wrapped in foils) completely without cracking.

For comparison, the old drying method of wrapping an 8.5 inch long sample with a foil at 95° C. would take 4 days to complete the drying. The following drying data supported the need of 4 days:

|  | No. 6-1 (20% SR/20% B) | | | | | |
|---|---|---|---|---|---|---|
| Days at 95° C. | 0 | 1 | 2 | 3 | 4 | 5 |
| Weight of sample (g) | 84.00 | 72.83 | 53.90 | 43.07 | 40.32 | 40.27 |

Results of studies on various effects are summarized below.

TABLE 1

| Combination of silicone resin (SR) no. 1-0469 and Bentolite L (B): | | | | | | |
|---|---|---|---|---|---|---|
| | Butane | Strength (psi) | | | | |
| | Adsorption mg/g | RT | 225° C. | 250° C. | 300° C. | 350° C. |
| 1-1 (No SR/B) | — | 510 | 110 | — | — | — |
| 1-2 (20% B) | 63.5 | 260 | | 350 | 270 | 280 |
| 1-3 (40% SR) | 49.5 | 460 | | 630 | 500 | 470 |
| 1-4 (40% SR/20% B) | 46.6 | 1910 | | 1460 | 1450 | 1350 |
| 1-5 (20% SR/20% B) | 53.2 | 1090 | | 1510 | 1370 | 1200 |

All batches had compositions of A4M (6%)/Airvol 205S (2%) with or without SR/B as shown above, and were cured first at 230° C./30 min. (except Nos. 1-1 and 1-2) followed by heat-treating at 1100° C./4 hrs. (except No. 1-1). The control, No. 1-1 would disintegrate in water at RT or when aged beyond 225° C. (4 hrs) in the air. Sample No. 1-2 (clay alone) had only a fair stability in water (30 days in water) as compared to a good one for No. 1-3 (SR alone) and excellent ones for Nos. 1-4 and 1-5 (combined systems). Clearly, a combined system of SR and B is needed to acquire a synergistic effect in yielding a high strength at 350° C. and good water stability, also with a good adsorption.

TABLE 2

LEVELS OF SR/B

| No. | | Butane Adsorption mg/g | Strength (psi) | | | |
|---|---|---|---|---|---|---|
| | | | RT | 250° C. | 300° C. | 350° C. |
| 2-1 | (10% SR/10% B) | | | | | |
| | HT at 1000° C./4 hrs. | — | 475 | 475 | 300 | 340 |
| 2-2 | (20% SR/10% B) | | | | | |
| | HT at 1000° C./4 hrs. | — | 525 | 525 | 425 | 360 |
| 2-3 | (40% SR/10% B) | | | | | |
| | HT at 1000° C./4 hrs. | — | 1300 | 1360 | 1310 | 1080 |
| | HT at 1100° C./4 hrs. | 49.5 | 1470 | 1700 | 1570 | 1370 |
| 2-4 | (20% SR/20% B) | | | | | |
| | HT at 1000° C./4 hrs. | — | 1270 | 1220 | 1240 | 1170 |
| | HT at 1100° C./4 hrs. | 53.2 | 1090 | 1510 | 1470 | 1200 |
| 2-5 | (20% SR/20% B) (400 cpsi/7 mil) (No curing) | | | | | |
| | HT at 1100° C./4 hrs. | 61.0 | 300 | 250 | 300 | 260 |
| 2-6 | (30% SR/20% B) | | | | | |
| | HT at 1100° C./4 hrs. | 50.0 | 1500 | 1330 | 1330 | 1340 |
| | HT at 1200° C./4 hrs. | — | 1410 | 1360 | 1300 | 1250 |
| 2-7 | (40% SR/20% B) | | | | | |
| | HT at 1100° C./4 hrs. | 46.6 | 1910 | 1460 | 1450 | 1360 |
| | HT at 1200° C./4 hrs. | 45.6 | 1860 | 1010 | 1050 | 1100 |
| 2-8 | (20% SR/40% B) | | | | | |
| | HT at 1100° C./4 hrs. | 45.9 | 2000 | 980 | 920 | 990 |
| | HT at 1200° C./4 hrs. | — | 1340 | 980 | 980 | 1100 |

All batches had compositions of A4M (6%)/Airvol 205S (2%) plus SR and B as shown above, and were cured first (except No. 2-5) at 230° C./30 min. followed by heat-treating (HT) as shown above. They used a die of 200 cpsi/22 mil cell wall/18 mil shim for skin formation, except No. 2-5 using a die of 400/7/7 and displaying the highest adsorption capacity due to a much larger surface area. All samples showed excellent water stabilities (>30 days). The best heat-treating temperature was 1100° C. The mixed SR/B systems of 40%/10% and 20–40%/20% all yielded excellent high temperature strength (>1000 psi) and good adsorption. However, with increasing SR and/or B, the adsorption of a batch decreased slightly, but its strength increased. A high bentonite batch (No. 2-8 with 40% B) had a detrimental effect on strength (as compared to No. 2-7).

TABLE 3

TYPES OF SR

| No. | | Butane Adsorption m/g | Strength (psi) | | | |
|---|---|---|---|---|---|---|
| | | | RT | 250° C. | 300° C. | 350° C. |
| 3-1 | (20% 1-0469/10% B) (cured) HT at 1000° C./4 hrs. | — | 525 | 525 | 425 | 360 |
| 3-2 | (20% 1-0468/10% B) (cured) HT at 1000° C./4 hrs. | — | 230 | 220 | 260 | 250 |
| 3-3 | (20% 1-0469/20% B) (cured) HT at 1100° C./4 hrs. | 53.2 | 1090 | 1510 | 1470 | 1200 |
| 3-4 | (20% 1-0450/20% B) (cured) HT at 1100° C./4 hrs. | 52.9 | 1640 | 1890 | 1400 | 1150 |
| 3-5 | (20% 1-0469/20% B) (uncured) | | | | | |
| | HT at 1100° C./4 hrs. | 52.7 | 720 | 780 | 850 | 830 |
| | HT at 1100° C./2 hrs. | 56.4 | 1200 | 1180 | 1160 | 1150 |
| 3-6 | (20% 6-2230/20% B) (uncured) HT at 1100° C./4 hrs. | 57.3 | 1100 | 1120 | 1120 | 960 |

Besides 1-0469, other silicone resin emulsions were also evaluated. Normally, extruded honeycombs containing silicone resin were cured at 230° C./30 minutes after drying and prior to a heat treatment (HT). However, the last two samples above were not cured prior to HT. There was no difference in water stability between a cured and uncured samples. Also, 6-2230 resin was used in a powder form (−60 mesh) with a mixed solvent system of isopropyl alcohol/ water (1/1 by weight) in No. 3-6, instead of water alone like all other batches. From the top two samples, emulsion 1-0469 (No. 3-1) is more efficient than 1-0468 (No. 3-2). From the middle two samples, emulsion 1-0450 (No. 3-4) may yield a slightly higher strength than that of 1-1069 (No. 3-3), but the former is not available in a large quantity currently. Finally, resin 6-2230 (No. 3-6) seems to perform about the same as 1-0469 (No. 3-5); however, the use of solvent, IPA, in a batch will make a process more tedious and unsafe.

values than those of earlier runs using a thicker die configuration (200/22/18), e.g., No. 5-1, HT at 4 hrs. vs. No. 3-3. All samples above displayed excellent water stabilities.

From data above, curing showed little effect on adsorption and some enhancement in strength with a 2 hour heat-treatment yielding the best strength. There was no effect on adsorption for both cured and uncured cases.

TABLE 4

CURING EFFECT

| No. | Butane Adsorption mg/g | Strength (psi) | | | |
|---|---|---|---|---|---|
| | | RT | 250° C. | 300° C. | 350° C. |
| 4-1 (20% SR/20% B) Cured | 53.2 | 1090 | 1510 | 1370 | 1200 |
| 4-2 (20% SR/20% B) Uncured | 52.7 | 720 | 780 | 850 | 830 |
| 4-3 (40% SR/10% B) Cured | 49.5 | 1470 | 1700 | 1580 | 1380 |
| 4-4 (40% SR/10% B) Uncured | 44.6 | 460 | 500 | 480 | 430 |
| 4-5 (40% SR/20% B) Cured | 46.6 | 1910 | 1460 | 1450 | 1350 |
| 4-6 (40% SR/20% B) Uncured | 49.8 | 1780 | 1830 | 1650 | 1460 |
| 4-7 (20% SR/20% B) Cured (thinner die) | 57.6 | 830 | 860 | 860 | 720 |
| 4-8 (20% SR/20% B) Uncured (thinner die) | 58.2 | 810 | 800 | 730 | 780 |

All used emulsion 1-0469. Curing was done at 230° C./30 minutes prior to a heat treatment of 1100° C./4 hrs. under nitrogen. A thick cell/skin configuration was produced in all samples (200 cpsi/22 mil wall/18 mil skin) except the last two with a thinner die configuration (200 cpsi/20 mil wall/15 mil skin), resulting in lower strength values for the last two samples. All samples, cured or uncured, yielded same excellent water stabilities once properly heat-treated at 1100° C. for 4 hours.

From the data above, curing showed little effect on adsorption in all cases and on strength for systems with a high binder content (e.g., 40%SR/20%B in No. 4-5 and No. 4-6) or for those using a thinner die (e.g., No. 4-7 and 4-8). But curing did enhance strength greatly for those with moderate binder contents (e.g., 20%SR/20%B or 40%SR/10%B in the top four cases).

TABLE 5

LENGTH OF HT

| No. | Butane Adsorption mg/g | Strength (psi) | | | |
|---|---|---|---|---|---|
| | | RT | 250° C. | 300° C. | 350° C. |
| 5-1 (20% SR/20% B) (cured) | | | | | |
| HT at 1100° C./1 hr. | 59.7 | 830 | 800 | 940 | 830 |
| HT at 1100° C./2 hrs. | 59.9 | 960 | 930 | 1070 | 920 |
| HT at 1100° C./4 hrs. | 57.6 | 830 | 860 | 860 | 720 |
| 5-2 (20% SR/20% B) (uncured) | | | | | |
| HT at 1100° C./1 hr. | 59.1 | 810 | 900 | 870 | 720 |
| HT at 1100° C./2 hrs. | 58.3 | 870 | 920 | 830 | 770 |
| HT at 1100° C./4 hrs. | 58.2 | 810 | 800 | 730 | 780 |

The purpose of a heat-treatment is to burn off organic binders (Methocel and PVA) and transform primarily silicone resin to silica bonding for a carbon substrate to withstand a high temperature condition. Emulsion 1-0469 and a thin die configuration (200 cpsi/20 mil wall/15 mil skin) were used in all runs above, resulting in lower strength

TABLE 6

TYPES OF CARBON POWDER

| No. | Butane Adsorption mg/g | Strength (psi) | | | |
|---|---|---|---|---|---|
| | | RT | 250° C. | 300° C. | 350° C. |
| 6-1 (80/20 C) | 50.0 | 1120 | 1030 | 1130 | 960 |
| 6-2 (100% BPL) | 53.2 | 1430 | 1410 | 1300 | 1200 |

Both had a binder composition of A4M (6%)/Airvol 205S (2%) plus 20% 1-0469/20% B (Bentolite L), and were cured first at 230° C./30 min. followed by heat-treating at 1100° C./4 hours. Samples also showed excellent water stabilities after 32 days. Thus a 100% BPL system seems to be better than a 80/20 one due to better strength and adsorption for the former. Both samples used a thinner die configuration (200 cpsi/20 mil wall/18 mil skin) than that of No. 3-3 (200/22/18), thus yielding a slightly lower strength in No. 6-1 as compared to No. 3-3.

TABLE 7

TYPES OF BENTONITE CLAY

| No. | Butane Adsorption mg/g | Strength (psi) | | | |
|---|---|---|---|---|---|
| | | RT | 250° C. | 300° C. | 350° C. |
| No. 7-1 (20% SR/20% GK)* | 53.3 | 1020 | 1100 | 930 | 860 |
| No. 7-2 (20% SR/20% L)* | 50.0 | 1120 | 1030 | 1130 | 960 |
| No. 7-3 (40% SR/20% L) | 43.8 | 2130 | 2150 | 2210 | 1840 |
| No. 7-4 (20% SR/20% GK) | 53.9 | 700 | 620 | 630 | 580 |
| No. 7-5 (20% SR/20% L) | 57.1 | 580 | 660 | 600 | 620 |
| No. 7-6 (40% SR/20% GK) | 44.4 | 1250 | 1030 | 1080 | 1000 |
| No. 7-7 (40% SR/20% L) | 45.7 | 980 | 890 | 1050 | 840 |

*GK — 129
*L — Bentolite L

All batches used a mixed carbon, emulsion 1-0469 and GK-129 or Bentolite L clay. Honeycomb samples were cured first at 230° C./30 min. followed by a HT at 1100° C./4 hrs./nitrogen. The top three used a die configuration of 200/20/18 whereas the rest used a thinner one of 200/15/15.

All systems showed excellent water stabilities. From above data, Bentolite L seemed to perform slightly better in a relatively thick die configuration (top 3 data) whereas GK-129 showed a slight edge in a thinner one (bottom 4 data). Thus both performed fairly closely for this application.

In summary, a good composition of an extruded carbon batch without oleic acid (with water as vehicle) is 100% BPL type or 80 BPL type/20 Nuchar® type carbon/6% A4M/2% Airvol 205S/20–40% 1-0469/10–20% Bentolite L or GK-129. After a long 4 day drying at 95° C., honeycomb samples were cured at 230° C./30 min. followed by a HT of 1100° C./2 hours/nitrogen. The heat-treated samples would show excellent water stability, good adsorption and very good high temperature strength (>1000 psi after 4 hrs. at 350° C. in the air). Uncuring would have no effect on adsorption or water stability, but would have some negative effect on strengths of low binder (20% SR/20% L and 40% SR/10% L) systems, but none on a high binder (40% SR/20% L) one.

measured on foil-dried samples. The samples dried in a RHO were solely for drying schedule study.

From above data, it was established that a nearly one to one replacement of oleic acid for water can be achieved in an activated carbon batch without affecting appreciably its rheology/extrusion quality. However, with a high 100% acid (No. 8-5), the extrudate was softer. All samples could be dried in a relative humidity controlled oven neatly (with no damp oleic acid trace) and completely (confirmed by following the sample weights during drying) in the specified schedule of 50 or 30 hours such as in Schedule A, B, or C as listed above in Table 8 (vs ~150 hrs. for a control sample, No. 8-1 without oleic acid in a RH oven).

All samples showed excellent water stabilities, but very poor adsorptions. The strength fell off sharply as the acid content increased from 0% (No. 8-1) to 100% (No. 8-5) in a 20% SR/20% GK composition. However, the strength remained high (>>1000 psi) even with the presence of 80% oleic acid in a batch, if a high (40%) SR emulsion was used (No. 8-6). This suggested that the curing of silicone resin present in a large (>20%) amount in a batch would not be affected appreciably by oleic acid.

In short, an equivalent replacement of oleic acid for water in a carbon batch could indeed cut down drying time very substantially (from ~150 to ~30 hrs.) with no adverse effect

TABLE 8

SYSTEM WITH OLEIC ACID AND WATER AS VEHICLE
THE MAXIMUM AMOUNT OF OLEIC ACID

| | Water/oleic (%) | RHO Sch. | Butane Adsorption mg/g | Strength (psi) | | | |
|---|---|---|---|---|---|---|---|
| | | | | RT | 250° C. | 300° C. | 350° C. |
| 8-1 (20% SR/20% GK 129) | 157/0 | (control) | 53.3 | 1020 | 1100 | 930 | 860 |
| 8-2 (20% SR/20% GK 129) | 107/40 | A | 37.7 | 680 | 650 | 680 | 630 |
| 8-3 (20% SR/20% GK 129) | 87/60 | A | 28.7 | 1020 | 1000 | 900 | 850 |
| 8-4 (20% SR/20% GK 129) | 75/80 | B | 37.0 | 530 | 560 | 650 | 460 |
| 8-5 (20% SR/20% GK 129) | 68/100 | C | 39.9 | 240 | 260 | 270 | 220 |
| 8-6 (40% SR/20% GK 129) | 65/80 | C | 30.1 | 1690 | 1670 | 1810 | 1570 |

The SR emulsion 1-0469 and GK-129 bentonite clay were used. Honeycomb samples were produced using a die configuration of 200/20/18. A few were dried under a specific RHO schedule, while the rest were still dried in foil at 95° C./4 days. After drying, all were cured (230° C./30 min.) and heat-treated at 1100° C./4 hrs./nitrogen. All properties were on extrusion quality. The maximum level of acid was around 100%. The cured and heat-treated sample showed no effect on water stability, but poor adsorption and strength (the higher the acid content, the lower the strength). However, some strength could be restored if a high (40%) level of SR was used.

TABLE 9

THE CURING EFFECT ON ADSORPTION

| No. | Water/oleic (%) | SR | Butane Adsorption mg/g | Strength (psi) RT | 250° C. | 300° C. | 350° C. |
|---|---|---|---|---|---|---|---|
| 9-1 | (40% SR/20% B) 171/0 (control) | | | | | | |
| | B7 (foil) | Cured | 43.8 | 2130 | 2150 | 2210 | 1840 |
| 9-2 | (40% SR/20% B) 73/80 | | | | | | |
| | B7 (foil) | Uncured | 36.9 | 1670 | 1060 | 1420 | 1480 |
| | B7 (foil) | Cured | 24.5 | 2370 | 2070 | 2070 | 2030 |
| | M7 (MW/RHO) | Uncured | 40.3 | | | | |
| | M9 (MW/RHO) | Uncured | 42.4 | | | | |
| | M10 (MW/RHO) | Uncured | 36.6 | | | | |
| | M10 (MW/RHO) | Cured | 19.9 | | | | |
| 9-3 | (40% SR/20% B) 95/60 | | | | | | |
| | B7 (foil) | Uncured | 44.4 | 2320 | 2430 | 2600 | 2300 |
| | B7 (foil) | Cured | 26.0 | 2590 | 2940 | 2740 | 2640 |
| | M7 (MW/RHO) | Uncured | 44.0 | | | | |
| | M9 (MW/RHO) | Uncured | 43.5 | | | | |
| | M10 (MW/RHO) | Uncured | 41.1 | | | | |
| | M10 (MW/RHO) | Cured | 29.5 | | | | |
| 9-4 | (30% SR/20% B) 78/80 | | | | | | |
| | B7 (foil) | Uncured | 47.7 | 650 | 710 | 700 | 660 |
| | B7 (foil) | Cured | 33.4 | 1350 | 1300 | 1240 | 1190 |
| | M7 (MW/RHO) | Uncured | 46.6 | | | | |
| | M9 (MW/RHO) | Uncured | 45.0 | | | | |
| | M10 (MW/RHO) | Uncured | 45.6 | | | | |
| | M10 (MW/RHO) | Cured | 32.0 | | | | |

All used emulsion 1-0469 and same lot of Bentolite L clay. The control (No. 9-1) did not contain any oleic acid. Honeycombs samples were produced using a die configuration of 200/20/18. A few samples (M7, M9 and M10) were dried first in a MW oven (1–2 min. just prior to arcing) followed by a RH oven under Schedule C (30 hrs). The rest (B7) were dried in foil with open ends (95° C./4 days). After drying, samples were cured or uncured, and heat-treated with various schedules under nitrogen: 1100° C./4 hrs. for B7 and M7, 1100° C./2 hrs. followed by 1300° C./2 hrs. for M9, and 1100° C./4 hrs. but with a longer soak (6 hrs. vs. the usual 2 hrs.) in the region of 200°–300° C. for M10. Basically, samples M7, M9 and M10 were used for studying the effects of drying, curing and HT on adsorption, whereas the rest (B7) were mainly for property measurements.

All acid-containing samples could be dried neatly and completely (in 30 hours in a RHO preceded with or without a MW drying, or 4 days at 95° C. with open-ended foil wrapping). The use of a MW oven preceding a RH oven was to expedite the initial drying so as to ensure a relatively short/complete drying in a RH oven. All heat-treated samples displayed excellent water stabilities.

From above data, the use of oleic acid in a carbon batch would lower adsorption (No. 9-2 B7 vs. No. 9-1 B7). Also curing of silicone resin prior to HT had a detrimental effect on adsorption in all acid-containing batches. However, the uncured sample of No. 9-2 B7 with a slow foil drying and conventional HT (1100° C./4 hrs.) still yielded a much lower adsorption than that of No. 9-1 B7, the control without oleic acid° Only with a faster drying of MW/RHO plus conventional HT such as M7 or the same fast drying with a modified HT (1100° C./2 hrs. then 1300° C./2 hrs.) such as M9, could the adsorption values be restored near that of the control. Another modified HT with a longer soak in the region of 200°–300° C. such as M10 failed to improve the adsorption.

The strength of No. 9-2 B7 was similar to that of No. 9-1 B7, the control, reconfirming earlier finding in Table 8) that the use of oleic acid would not affect strength in a cured batch if a high (40%) level of SR was used. However, the uncured 40% SR one (with much better adsorption) had a lower strength but was still sufficiently high (>>1000 psi at 350° C.) to be of practical use. The use of Bentolite L in No. 9-2 B7 (cured) seemed to yield a higher strength than that of GK-129 in No. 8-6, but the latter had a slightly better adsorption.

In No. 9-3 the oleic acid level was lowered to 60% as compared to 80% in No. 9-2. This lower acid batch showed that a conventional slow foil drying/HT (B7, uncured) was equally effective to a fast drying/HT (M7 and M9) in generating high adsorption, i.e., uncuring was essential to, but a fast MW/RH drying might not be necessary for a good adsorption in an acid-containing system. Also, this system showed an unusually high strength (even the uncured case had a much greater strength than that of the control, No. 9-1). Based on all properties, this low acid batch seemed to be a good candidate also.

In No. 9-4, the SR content was lowered from 40% (in No. 9-2) to 30%. The immediate impact was the enhancement in the adsorptions of uncured samples. But the strength deteriorated too much to make this system viable, confirming the earlier finding that a high (40%) SR content was necessary for yielding a high strength in a high (80%) oleic acid batch.

In short, a carbon batch containing oleic acid (≦100%) was established to produce honeycomb samples which could be dried in a relatively fast schedule (<30 hrs.) in MW/RH ovens to yield an excellent water stability and strength, and good adsorption. The SR used had to be in a high (~40%) level plus 20% Bentolite L, and should remain uncured prior to a HT. Both HT's (under nitrogen) of 1100° C./4 hrs. or 1100° C./2 hrs. followed by 1300° C./2 hrs. were effective in yielding samples with good properties.

5,543,096

TABLE 10

EFFECT OF HT (1100° C./1300° C.):

| No. | Water/oleic (%) | Butane Adsorption mg/g | Strength (psi) RT | 250° C. | 300° C. | 350° C. |
|---|---|---|---|---|---|---|
| 10-1 (40% SR/20% B) (Die 200/20/18) 100% BPL Carbon M9 | 73/80 | | | | | |
| A (2 hrs./1 hr.) | | 40.9 | 1040 | 970 | 980 | 990 |
| B (2 hrs./2 hrs.) | | 43.0 | 990 | 1000 | 925 | 925 |
| C (1 hr./2 hrs.) | | 41.9 | 810 | 940 | 1010 | 925 |
| 10-2 (similar to 10-1, except 200/20/22 in die) 100% BPL Carbon M9 | 77/80 | | | | | |
| A (2 hrs./1 hr.) | | 43.0 | 1100 | 1050 | 1190 | 1210 |
| B (2 hrs./2 hrs.) | | 41.6 | 1020 | 910 | 880 | 900 |
| C (1 hr./2 hrs.) | | 38.0 | 1090 | 920 | 930 | 990 |
| 10-3 (40% SR/20% R) (Die 200/20/18) 80/20 Carbon M9 | 77/80 | | | | | |
| A (2 hrs./1 hr.) | | 40.9 | 940 | 960 | 1000 | 880 |
| B (2 hrs./2 hrs.) | | 42.1 | 760 | 700 | 750 | 650 |
| C (1 hr./2 hrs.) | | 41.3 | 700 | 770 | 690 | 820 |
| 10-4 (30% SR/20% R) (Die 200/20/18) 100% BPL Carbon M9 | 91/60 | | | | | |
| A (2 hrs./1 hr.) | | 43.2 | 1350 | 1350 | 1400 | 1340 |
| B (2 hrs./2 hrs.) | | 44.0 | 1170 | 1150 | 1350 | 1260 |
| C (1 hr./2 hrs.) | | 44.8 | 1280 | 1210 | 1450 | 1310 |

This study was undertaken to determine a good HT schedule of M9 identified in Table 9. All used emulsion 1-0469 and same lot of Bentolite L clay as in Table 9. This was the first time a 100% BPL-F3 carbon was used in a batch containing oleic acid. Also, for the first time, all honeycomb samples were dried first in a MW oven (5 samples, each 8.5 in. long, for ~3 min. just prior to arcing) followed by a RH oven under Schedule C (30 hrs.). No curing of SR was involved.

All acid-containing samples could be dried neatly and completely in a mixed MW/RH oven in 30 hrs. The moderate scale up in a MW oven (from 1 in Table 9 to 5 samples here in Table 10 and RH oven (from 3 to 15 samples) was successful. No attempt was made to further shorten that schedule. Potentially, that schedule can be reduced to less than 30 hrs. All heat-treated samples except M9C showed excellent water stabilities. The M9C condition sometimes yielded a very minor smudges on wet skins when rubbed.

From above data, the M9A HT condition (1100° C./2 hrs. then 1300° C./1 hr.) seemed to yield the best overall properties of adsorption and strength followed by the M9B (1100° C./2 hrs. then 1300° C./2 hrs.). The M9C (1100° C./1 hr. then 1300° C./2 hrs.) generally yielded the worst result except in No. 10-4 case.

The use of 100% BPL-F3 carbon (No. 10-1) was reconfirmed to yield better strength than that of a 80%/20% carbon system (No. 10-3) even in batches containing acid (The adsorption of No. 10-3 M9B repeated well that of No. 9-2 M9 in Table 9).

It was noticed that the skin of a 100% BPL batch with oleic acid such as No. 10-1 would tend to be thinner than that of a 80/20 carbon with oleic acid such as No. 10-3. So a run with a thicker shim was used to form a more comparable skin thickness in the 100% BPL case, No. 10-2, resulting in a slightly better strength in the preferred condition M9A.

Another good candidate besides No. 10-1 for a 100% BPL/oleic acid batch was No. 10-4 in which both the SR resin and oleic acid contents were lowered to 30% (from 40%) and 60% (from 80%) respectively. The adsorption and strength of No. 10-4 were much better than those of No. 10-1 with the M9A condition still yielding the best strength.

In short, a 100% BPL-F3 or 80/20 carbon batch containing oleic acid (60–80%) was established to produce honeycomb samples which could be dried in a relatively fast schedule (<30 hrs.) in MW/RH ovens to yield an excellent water stability and strength, and good adsorption. The use of a 100% BPL carbon would generate a better strength than that of a 80/20 carbon system. The SR used had to be in a high 30–40% range plus 20% Bentolite L, and should remain uncured prior to a HT. A good HT schedule (under nitrogen) was determined to be 1100° C./2 hrs. followed by 1–2 hrs. at 1300° C. with the 1 hr/1300° C. being preferable. A preferred composition would be a 100% BPL carbon/6% A4M/2% Airvol 205S/30–40% 1-0469/20% Bentolite L with 60–80% oleic acid (90–70% water).

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for making an activated carbon body, the method comprising:

a) forming a wet mixture comprising in percent by weight based on activated carbon, about 2% to 10% organic binder selected from the group consisting of cellulose ethers, cellulose ether derivatives, and combinations thereof, 0 to about 4% of polyvinyl alcohol, about 5% to 40% bentonite clay, about 10% to 50% silicone resin, vehicle having a boiling point of at least about 100° C., and the balance of the mixture being activated carbon particles;

b) forming said mixture into a green body;

c) drying the green body; and d) heat-treating the dried body to form the activated carbon body.

2. A method of claim 1 wherein the activated carbon particles have an average particle size of about 3 to 10 micrometers in diameter and surface area as measured by $N_2$ BET method of about 1050 to 1300 $m^2/g$.

3. A method of claim 1 wherein about 80% by weight of the activated carbon particles have an average particle size of about 3 to 10 micrometers in diameter and surface area as measured by $N_2$ BET method of about 1050 to 1300 $m^2/g$, and about 20% by weight of the activated carbon particles have an average particle size of about 20 to 50 micrometers in diameter and a surface area as measured by $N_2$ BET method of about 1300 to 1350 $m^2/g$.

4. A method of claim 1 wherein said organic binder is selected from the group consisting of methylcellulose, hydroxybutyl methylcellulose, hydroxypropyl methylcellulose, hydroxyethyl methylcellulose, sodium carboxy methylcellulose, and mixtures thereof.

5. A method of claim 4 wherein the organic binder is selected from the group consisting of methylcellulose, hydroxypropyl methylcellulose, and combinations thereof.

6. A method of claim 1 wherein the organic binder content is about 4% to about 8% by weight based on the activated carbon.

7. A method of claim 1 wherein polyvinyl alcohol is present in the mixture.

8. A method of claim 1 wherein the mixture contains 0 to about 3% by weight polyvinyl alcohol based on the activated carbon.

9. A method of claim 1 wherein the bentonite clay content is about 10% to 30% based on the activated carbon.

10. A method of claim 1 wherein the silicone resin content is about 20% to 40% based on the activated carbon content.

11. A method of claim 1 wherein the vehicle is selected from the group consisting of water, oleic acid, oleic acid derivatives, linoleic acid, linoleic acid derivatives, and combinations thereof.

12. A method of claim 11 wherein the vehicle is water.

13. A method of claim 12 wherein after the drying step and before the heat-treating step, the silicone resin is cured.

14. A method of claim 13 wherein after the curing step, the body is heat-treated at a temperature of about 1100° C. to 1300° C. for about 1 to 2 hours in a non-reacting atmosphere.

15. A method of claim 11 wherein the vehicle is a mixture of water and oleic acid.

16. A method of claim 15 wherein immediately after the drying step the dried body with the silicone resin in the uncured state is heat-treated at a temperature of about 1100° C. to about 1300° C. for about 1 to 2 hours in a non-reacting atmosphere.

17. A method of claim 1 wherein the wet mixture comprises in percent by weight based on the carbon about 4% to 8% organic binder selected from the group consisting of methylcellulose, hydroxybutyl methylcellulose, hydroxypropyl methylcellulose, hydroxyethyl methylcellulose, sodium carboxy methylcellulose, and mixtures thereof, 0 to about 3% polyvinyl alcohol, about 5% to 30% bentonite clay, about 10% to 40% silicone resin.

18. A method of claim 17 wherein the wet mixture comprises in percent by weight based on the carbon about 6% to 8% organic binder selected from the group consisting of methylcellulose, selected from the group consisting of methylcellulose, hydroxybutyl methylcellulose, hydroxypropyl methylcellulose, hydroxyethyl methylcellulose, sodium carboxy methylcellulose, and mixtures thereof, 1 to about 3% polyvinyl alcohol, about 10% to 20% bentonite clay, about 20% to 40% silicone resin.

* * * * *